(12) United States Patent
Phillips, III et al.

(10) Patent No.: US 12,267,596 B1
(45) Date of Patent: Apr. 1, 2025

(54) EXPOSURE BRACKETED QUICK BURST FOR LOW FRAME RATE CAMERAS

(71) Applicant: Meta Platforms Technologies, LLC, Menlo Park, CA (US)

(72) Inventors: Robert Phillips, III, San Mateo, CA (US); Jiangtao Kuang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 54 days.

(21) Appl. No.: 17/896,931

(22) Filed: Aug. 26, 2022

Related U.S. Application Data

(60) Provisional application No. 63/237,707, filed on Aug. 27, 2021.

(51) Int. Cl.
  *H04N 23/741* (2023.01)
  *G02B 27/01* (2006.01)
  *H04N 23/743* (2023.01)

(52) U.S. Cl.
  CPC ....... *H04N 23/741* (2023.01); *G02B 27/0172* (2013.01); *H04N 23/743* (2023.01); *G02B 2027/0138* (2013.01); *G02B 2027/0178* (2013.01)

(58) Field of Classification Search
  CPC ............... H04N 23/741; H04N 23/743; G02B 27/0172; G02B 2027/0138; G02B 2027/0178
  USPC ..................................................... 348/222.1
  See application file for complete search history.

(56) References Cited

U.S. PATENT DOCUMENTS

| | | | |
|---|---|---|---|
| 9,674,255 B1* | 6/2017 | Tiwary | H04L 65/762 |
| 2013/0082109 A1* | 4/2013 | Meier | G06K 7/10732 |
| | | | 235/472.01 |
| 2014/0071324 A1* | 3/2014 | Tokunaga | H04N 23/633 |
| | | | 348/333.02 |
| 2015/0097978 A1* | 4/2015 | Lee | H04N 23/6845 |
| | | | 348/208.6 |
| 2017/0171446 A1* | 6/2017 | Nashizawa | G06T 5/007 |
| 2018/0176483 A1* | 6/2018 | Knorr | H04N 23/957 |
| 2018/0220061 A1* | 8/2018 | Wang | G06N 3/02 |

(Continued)

OTHER PUBLICATIONS

Sung M., "How to Take HDR Photos on Your iPhone," Mashable, Aug. 8, 2021, 7 pages, Retrieved from Internet: URL: https://mashable.com/article/how-to-take-hdr-photos-iphone.

*Primary Examiner* — Usman A Khan
(74) *Attorney, Agent, or Firm* — Freestone Intellectual Property Law PLLC; Aaron J. Visbeek

(57) ABSTRACT

A camera system that captures an HDR (High Dynamic Range) image with an improved burst duration time and faster frame rate. The camera system determines a set of different exposure settings for creation of an HDR image. The camera system provides the set of exposure settings to the camera sensor in a series of sequential timing windows. A sensor of the camera system outputs a plurality of stale frames in sequential timing windows for receiving the set of different exposure settings. The plurality of stale frames are followed by a set of image frames in sequential timing windows, with each image captured at a different exposure setting of the set of different exposure settings. The camera system may generate a HDR image using the captured sequence of images.

19 Claims, 7 Drawing Sheets

(56) References Cited

U.S. PATENT DOCUMENTS

2022/0138964 A1* 5/2022 Gintsburg ............ H04N 23/743
382/103

* cited by examiner

500

Determining a set of exposure settings for creation of an HDR (high dynamic range) image
510

Providing, in sequential timing windows to the sensor, different exposure settings from the set of exposure settings
520

Capturing a sequence of images from a local area, the capturing such that the sensor first outputs a plurality of stale frames in sequential timing windows followed by a set of image frames in sequential timing windows, wherein each image frame is captured at a different exposure setting of the set of exposure settings
530

Generating a high-dynamic range image using the captured sequence of images
540

FIG. 5

EXPOSURE BRACKETED QUICK BURST FOR LOW FRAME RATE CAMERAS

CROSS-REFERENCE TO RELATED APPLICATIONS

This application claims the benefit of U.S. Provisional Application No. 63/237,707, filed on Aug. 27, 2021, which is incorporated by reference in its entirety.

FIELD OF THE INVENTION

This disclosure relates generally to quick burst imaging, and more specifically to an exposure bracketed quick burst for low frame rate cameras.

BACKGROUND

One of the largest contributors to capture latency is a time that a camera sensor uses to change settings during exposure bracketing (e.g., as part of generating a high dynamic range image). For example, a camera sensor typically takes several frames before new sensor settings (e.g., exposure setting) are fully implemented. Conventional sensors typically have a fast enough frame rate (e.g., 30 or more frames per second) where capture latency is not a significant issue. However, for camera sensors that have a relatively low frame rate (e.g., 15 fps) having one or more stale frames in combination with the low frame rate may greatly increase chances of errors occurring (e.g., ghosting) in generating an HDR (high dynamic range) image.

SUMMARY

Exposure bracketed quick burst for low frame rate cameras is described herein. A set of different exposure settings is determined (e.g., via a camera system) for creation of an HDR image. The set of exposure settings are provided to a camera sensor in a series of sequential timing windows. The sensor of the camera may output a plurality of stale frames in sequential timing windows for receiving the set of different exposure settings. The plurality of stale frames may be followed by a set of image frames in sequential timing windows, with each image captured at a different exposure setting of the set of different exposure settings. A HDR image may be generated using the captured sequence of images.

In some embodiments, a method comprises determining a set of exposure settings. Different exposure settings from the set of exposure settings are provided to the sensor in sequential timing windows. The sensor captures a sequence of images from a local area, the capturing such that the sensor first outputs a plurality of stale frames in sequential timing windows followed by a set of image frames in sequential timing windows, wherein each image frame is captured at a different exposure setting of the set of exposure settings. A HDR image is generated using the captured sequence of images.

In some embodiments, a system comprises an imaging device including an image sensor configured to capture images. The system also comprises a controller configured to determine a set of exposure settings for creation of an HDR (high dynamic range) image. The controller may be also configured to provide, in sequential timing windows to the sensor, different exposure settings from the set of exposure settings. The controller may be also configured to capture, by the sensor, images from a local area, the capturing such that the sensor first outputs a plurality of stale frames in sequential timing windows followed by a set of image frames in sequential timing windows, wherein each image frame is captured at a different exposure setting of the set of exposure settings. The controller may be also configured to generate a high-dynamic range image using the captured images.

In some embodiments, a non-transitory computer-readable storage medium comprises stored instructions. The instructions when executed by a processor of a device, cause the device to determine a set of exposure settings for creation of an HDR (high dynamic range) image. The instructions further cause the device to provide, in sequential timing windows to the sensor, different exposure settings from the set of exposure settings. The instructions further cause the device to capture, by the sensor, images from a local area, the capturing such that the sensor first outputs a plurality of stale frames in sequential timing windows followed by a set of image frames in sequential timing windows, wherein each image frame is captured at a different exposure setting of the set of exposure settings. The instructions further cause the device to generate a high-dynamic range image using the captured images.

BRIEF DESCRIPTION OF THE DRAWINGS

FIG. 5 is a flowchart illustrating steps for taking an HDR image using the camera system, in accordance with one or more embodiments.

Figure 1A:
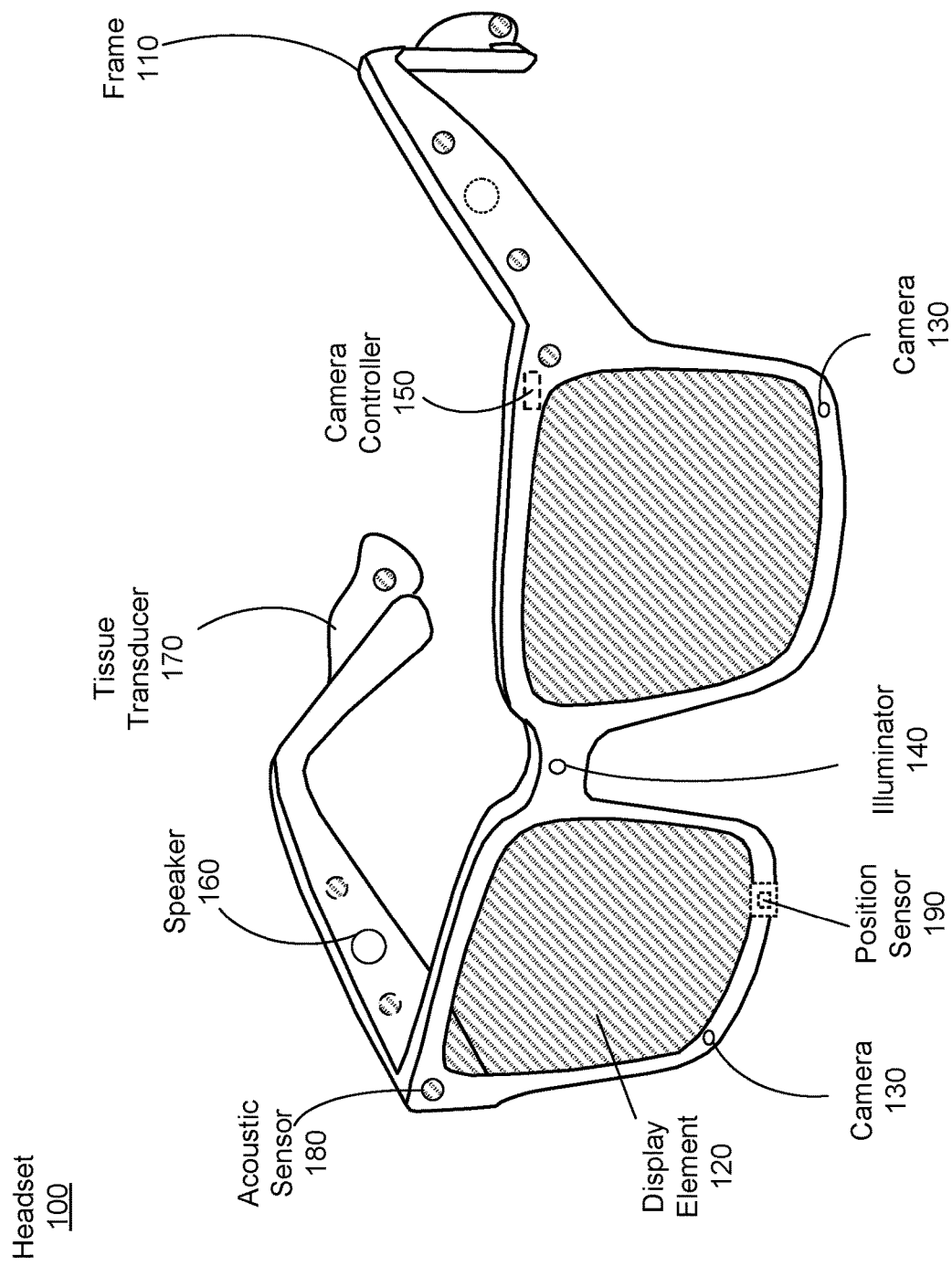
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Described herein is a camera system that uses exposure bracketed quick burst. The system may reduce burst duration time between captured image frames, thereby preventing potential errors and improving image quality of the generated HDR images. This is particularly important in cases where the frame rate is relatively low (e.g., lower than 30 frames per second). Traditionally, one of the largest contributors to the time latency is known as a sensor update penalty. The sensor update penalty is caused by one or more stale frames that a sensor works through between receiving exposure settings and configuring the sensor (e.g., adjusting exposure time and/or gain settings) to capture images in accordance with the received exposure settings. For example, if exposure settings are updated on frame 1, the processor has to drop frames 2 and 3, and frame 4 is the first image frame that was captured with the updated exposure settings. If the time interval between each frame is 33 ms, the traditional method may use 100 ms to take two images.

Described herein is a camera system that reduces the sensor update penalty. In the camera system exposure settings are sent to a sensor of the camera system in a sequential series of image frames. This can reduce a time latency between images to the time interval between two consecutive frames-which is not available with conventional sensors taking images in a burst mode (as in a burst mode there would be multiple stale frames between consecutive images) to generate an HDR image. The camera system described herein improves on the current HDR image generating technology by enabling the sensor to take consecutive images over consecutive frames, which decreases the chance for having an error in the HDR image and improves the image quality.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device (e.g., smart glasses), in accordance with one or more embodiments. The headset 100 includes a camera system.

The camera system captures images of a local area. The camera system includes one or more cameras 130 and a camera controller 150. In some embodiments, the camera system additionally includes a depth camera assembly (DCA) for sensing depth of objects in the local area of the camera system. In that embodiment the camera controller 150 additionally acts as a DCA controller and provides instructions to the DCA.

The camera 130 may comprise one or more cameras configured to capture images or video of the environment around the headset 100. The camera 130 may include an image sensor that receives light from the local area and a lens through which light passes from the local area to reach the image sensor. In one embodiment, the sensor may be a low frame rate sensor. Low frame rate sensors are useful for low power applications and/or applications where there is a low power budget for the camera (e.g., a camera system that is integrated into a headset with a limited power budget). A low frame rate sensor may capture images at less than 30 fps (frames per second). For example, a low frame rate sensor may have a capture rate of 15 fps. In other embodiments, the sensor may capture frames at 30 fps or higher. The sensor is such that when exposure settings are received, the sensor has at least one timing window before being able to capture an image in accordance with the received exposure settings. Moreover, the sensor may receive a second set of exposure settings in a same time window that the sensor is capturing a valid image frame using a previously received set of exposure settings.

In some embodiments, the one or more cameras are wide angle cameras. The camera 130 may have an associated field of view (FOV) that determines the boundaries of the range in which the camera 130 can capture images and video. The headset 100 may include multiple cameras 130, each with a different FOV.

The camera controller 150 processes information from the camera 130. The camera controller 150 may comprise a processor and a computer-readable storage medium. The camera controller 150 additionally determines a mode of operation for the camera and provides instructions to the camera 130 based on the mode of operation. The camera controller 150 may also be configured to process images captured by the camera such as to determine intensities of each pixel of a captured image and combine multiple captured images into an HDR final image.

In some embodiments, the camera controller 150 determines a mode of operation of a camera based on a single initial image. The initial image is captured by the camera 130 of the system and downsampled by the camera controller 150 to a smaller size and/or a lower resolution. The pixels of the downsampled initial image are analyzed to determine the light intensity at each pixel. The analysis may include graphing the pixels using a histogram or calculating a measure of pixels that are above a certain intensity. Based on the analysis, a mode of operation (e.g., a determination of whether or not to use HDR to capture a final image) is selected. In some embodiments, if a non-HDR mode is chosen, the initial image may be used as a final image. If an HDR mode of operation is chosen, the camera 130 of the camera system may be used to capture multiple images across a range of exposure values and combine those images into a single final image, as exemplified in FIG. 4.

In some embodiments, the camera controller 150 determines a mode of operation of the camera 130 based on multiple initial images taken across a range of exposure values. In some embodiments, the initial images are taken across the full range of exposure values the camera 130 is capable of capturing. The multiple images are processed by the camera controller 150 to determine two characteristic images. The first characteristic image is the image having the lowest exposure value (e.g., is the darkest) of the initial images that has a number of saturated (e.g., bright white) pixels above a first threshold. The second characteristic image is the image having the highest exposure value (e.g., is the brightest) of the initial images that has a number of dark pixels above a second threshold. A ratio of the exposure value of the first characteristic image and the exposure value of the second characteristic image is used to determine whether to use HDR to capture a final image. In some embodiments, the described process is used to determine a range of exposure values at which to capture images that may be combined into an HDR final image.

In one embodiment, the camera controller 150 may generate instructions for the sensor to capture a plurality of images, and each of the plurality of images being to be captured in accordance with a different set of exposure settings of a set of exposure settings. The exposure settings may be, e.g., to capture a series of images at different exposure values (EV). For example, 0 EV, −2 EV, and +2 EV. The controller 150 provides each of the exposure settings sequentially in different timing windows to the sensor such that the sensor first outputs a plurality of stale frames in sequential timing windows followed by a set of image frames in sequential timing windows and each image frame is captured at a different exposure setting of the set of exposure settings.

In some embodiments, the eyewear device is a near eye display (NED). In general, the headset 100 may be worn on the face of a user such that content (e.g., media content) is presented using a display assembly and/or a camera system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), a camera system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

In some embodiments, the headset 100 may not have a display element 120. For example, in place of the display element 120 may be lenses of glasses through which a user of the headset 100 can see.

The DCA determines depth information for a portion of a local area surrounding the headset 100. The DCA includes one or more cameras 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more cameras 130 capture images of the portion of the local area that include the light from the illuminator 140. As illustrated, FIG. 1A shows a single illuminator 140 and two cameras 130. In alternate embodiments, there is no illuminator 140 and at least two cameras 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

In some embodiments, one or more acoustic sensors 180 may be placed in an ear canal of each ear (e.g., acting as binaural microphones). An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the cameras 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
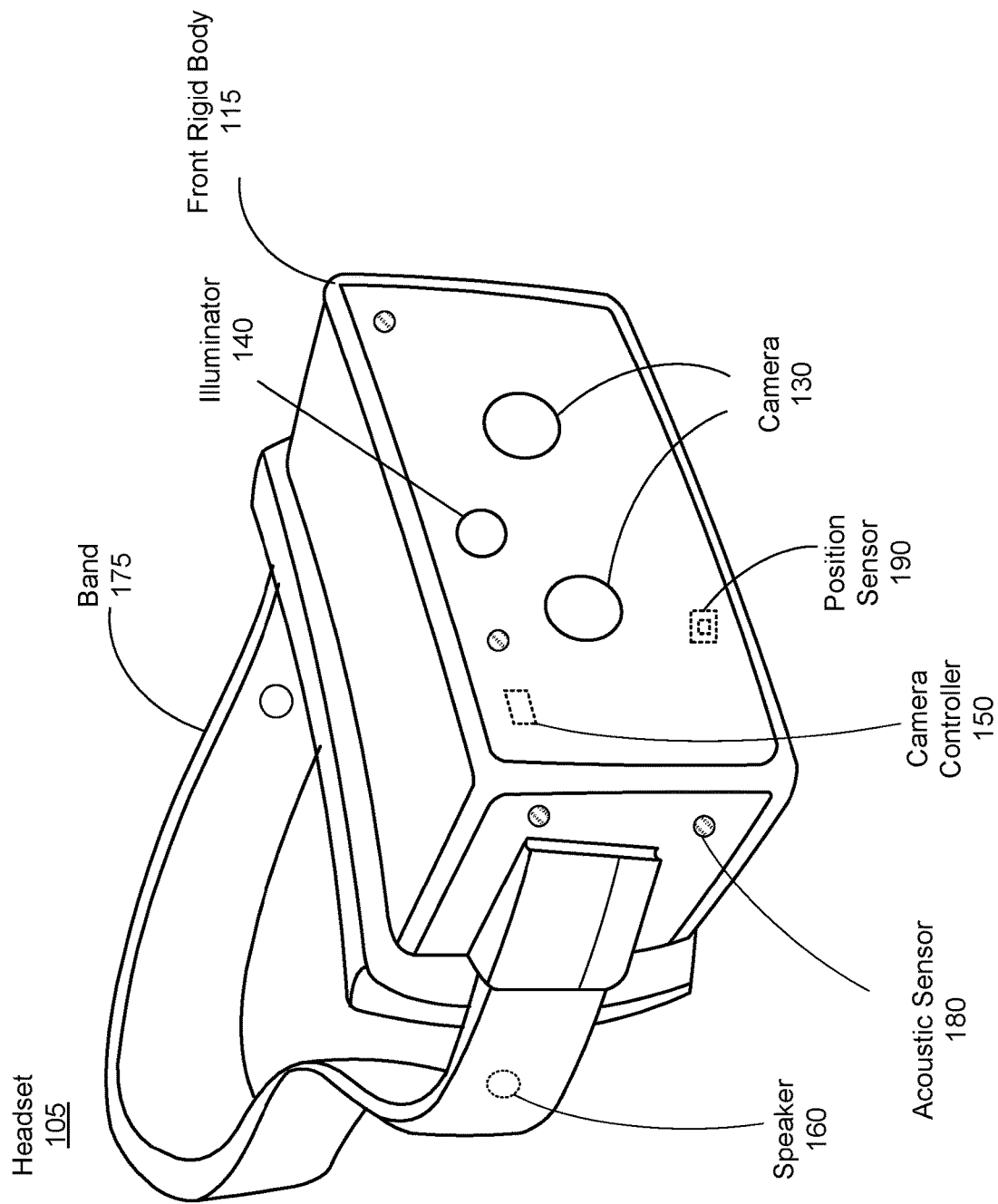
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes a display assembly, a DCA, a camera system, and a position sensor 190. FIG. 1B shows the illuminator 140, the camera controller 150, a plurality of the speakers 160, a plurality of the cameras 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Headset 105 of FIG. 1B may also host the camera system described above. The camera system uses components of headset 105 such as the cameras 130 and camera controller 150 to determine a mode of operation of the camera system and capture images based on the mode of operation.

Figure 2:
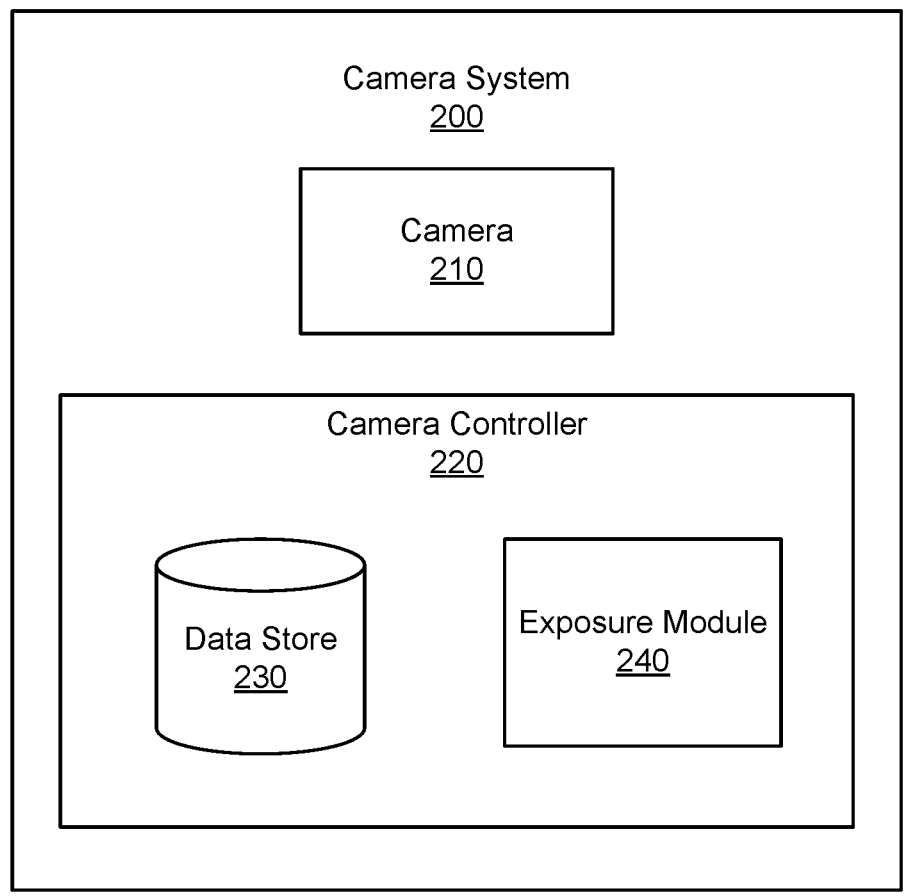
FIG. 2 is a block diagram of a camera system, in accordance with one or more embodiments.

FIG. 2 is a block diagram of a camera system 200, in accordance with one or more embodiments. The camera system described above with reference to FIG. 1A or FIG. 1B may be an embodiment of the camera system 200. The camera system may be integrated into a wearable device (e.g., headset, watch, etc.).

The camera 210 captures images of a local area. The camera 210 may be an embodiment of the camera 130 on the headset 100 and/or the headset 105. In some embodiments, the camera 210 is more than one camera. Each image captured by the camera 210 has an exposure value representing how much light from the local area is received by the camera 210. The exposure value, for a particular gain value, is dependent on the f-stop and the exposure time camera. A high exposure value results in more light being received by the camera 210, creating a brighter image. One might use a high exposure value such as to capture images of the night sky. A low exposure value results in less light being received by the camera 210. One might use a low exposure value such as to capture an image of a local area that is brightly lit.

The camera controller 220 controls components of the camera system 200. In the embodiment of FIG. 2, the camera controller 220 includes a data store 230, an exposure module 240. Some embodiments of the camera controller 220 have different components than those described here. Similarly, functions can be distributed among the components in different manners than described here. For example, if the camera system 200 is part of a wearable device, some functions of the camera controller 220 may be performed external to the wearable device.

The data store 230 stores data for use by the camera system 200. The data store 230 may hold, for example, previously captured images, threshold values for saturated and dark pixels, location and time stamp data of captured images, biographical information of the user, privacy settings and other preferences of the user, and other parameters for the camera system 200. The data store 230 may be cloud storage in which data is configured to be transmitted from a wearable device to a server through a network, as discussed further with reference to FIG. 6. In situations in which the wearable device lacks network connectivity, the data store 230 may act as short-term storage until the headset connects to a network and can upload data stored in the data store 230.

In some embodiments, the data store 230 stores EV settings for different EV values, each EV value for a picture in a series of pictures taken for producing an HDR image. For example, the data store 230 may hold a set of EV settings determined by the exposure module 240 for generating an HDR image. The exposure module 240 is discussed in greater detail below.

The exposure module 240 determines a set of exposure settings for creation of an HDR image. In some embodiments, the camera system 200 determines the set of exposure settings (for different EVs) automatically based in part on a dynamic range of a sensor of the camera 210 and a dynamic range of light in the local area. In some embodiments, the range of EVs is based on a pre-set number of frames that each have different exposure values (e.g., −1 EV, 0 EV, +1 EV). In some embodiments the EV range is based on a brightness histogram. For example, if the histogram indicates that there are a large number of saturated pixels but a low number of dark pixels, the EV range may be focused at higher EVs than the initial image EV to capture detail in the saturated pixels.

Once the range of EVs is determined, the exposure module 240 provides, in sequential timing windows to the sensor of the camera, different exposure settings from the set of exposure settings. In some embodiments, there are "N" number of timing windows, "S" number of stale frames, and "I" number of images. In these instances, N=S+I, and I is greater than S, where N, S, and I are integers. In contrast, in a conventional camera system taking images in burst mode to generate an HDR image S is greater than I-resulting is a larger number of total frames and a lower frame rate. This is discussed in detail below with regard to FIGS. 3 and 4. The sensor captures, a sequence of images from the local area. The capturing such that the sensor first outputs a plurality of stale frames in sequential timing windows followed by a set of image frames in sequential timing windows, and each image frame is captured at a different exposure setting of the set of exposure settings.

After the sensor is provided with a new exposure setting, of the set of exposure settings (which may be different from each other), in a first timing window of the sequential timing windows, a predetermined number of timing windows occur before the sensor captures images using the new exposure setting. For example, the sensor may require two timing windows before an image may be taken according to the new exposure setting. By sending the exposure values in sequential timing windows it mitigates how many timing windows are occupied by stale frames.

The exposure module 240 generates a HDR image using the captured sequence of images. For example, different portions (that have proper exposure) of the captured frames may be fused together into a single HDR image. Accordingly, it is generally ideal that a time difference between each image frame is as small as possible in order to minimize fusion artifacts that negatively impact the quality of the final HDR image (e.g., motion blur, ghosting, etc.). As noted above, and described below with regard to FIG. 4, the camera system 200 has a substantially faster frame rate than conventional cameras taking images in burst mode to form an HDR image, thereby mitigating potential fusion artifacts.

Figure 3:
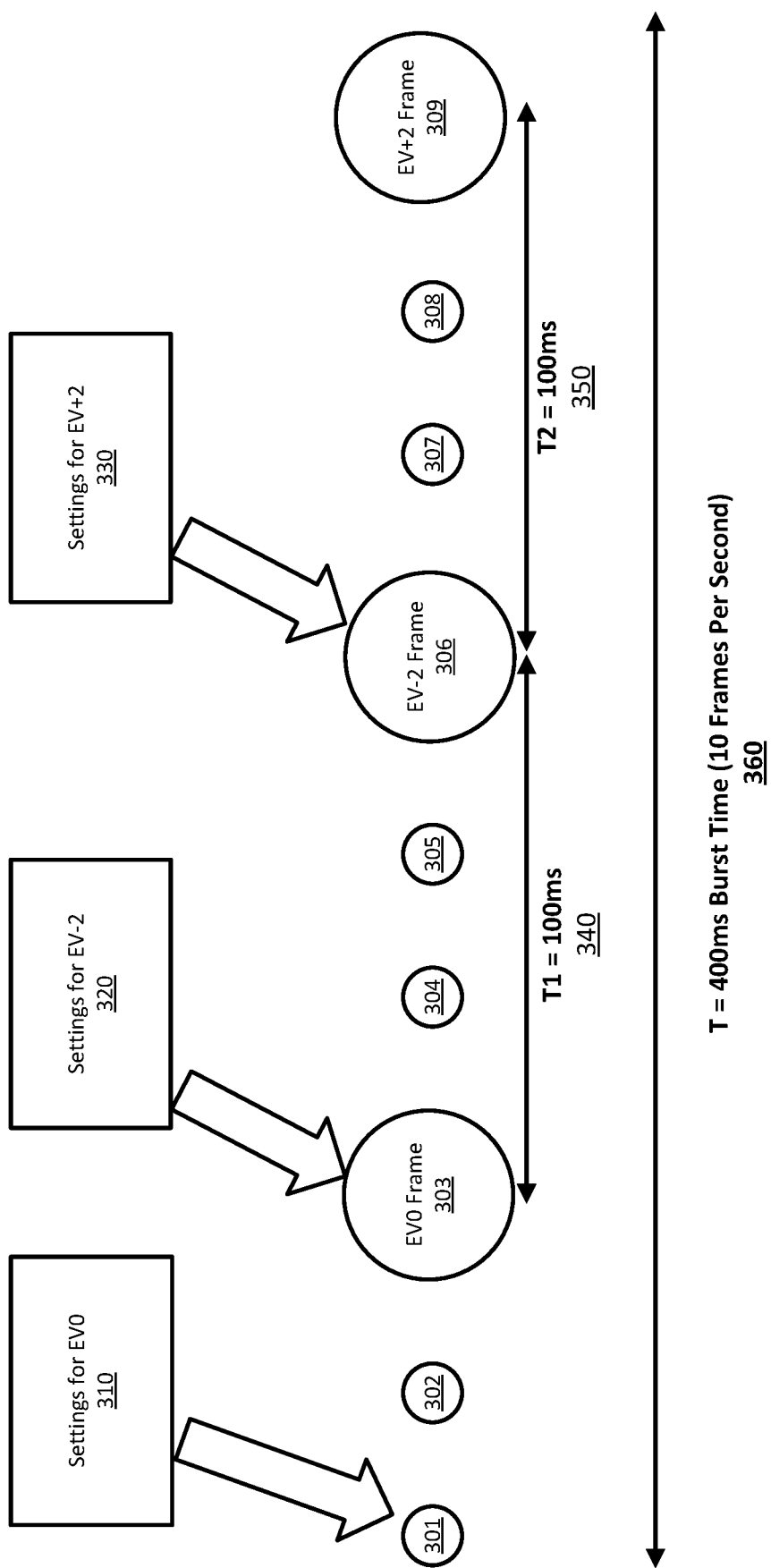
FIG. 3 is a diagram illustrating one example embodiment for taking multiple images over a range of exposure values.

FIG. 3 is an example for taking multiple images over a range of exposure values. The example show in FIG. 3 is what occurs in a conventional camera taking images in burst mode to form an HDR image. In the example illustrated in FIG. 3, each frame 301, 302, 303, 304, 305, 306, 307, 308, 309 may represent a frame that a sensor of the conventional camera outputs. For example, the sensor may output frames at 15 frames per second (15 fps), the frames 301, 302, 303, 304, 305, 306, 307, 308, 309 representing a sequence of consecutive frames, each separated from each other by a time period (e.g., 33 ms). The frames 301, 302, 304, 305, 307, 308 represent stale frames where no images are captured. The frames 303, 306, and 309 are shown with larger circles and represent frames (also referred to as image frames) where images are captured. In the example illustrated in FIG. 3, three different sets of exposure settings are sent to the sensor for frames 301, 303, and 306. Settings 310 for EV0 are sent at image frame 301. Frames 301 and 302 are stale frames (e.g., the sensor may use time to apply the exposure settings). The sensor may then capture an image frame for EV0 at EV0 the frame 303 and send the settings 320 for EV−2 to the sensor. In some embodiments, the actions of capturing an image frame and sending settings may occur concurrently. The sensor may then use another period of time to configure the exposure settings, which results in the frames 304 and 305 being stale frames. At frame 306, an image with EV−2 settings is captured, and at the same time, the settings 330 for EV+2 are sent to the sensor. Frames 307 and 308 are dropped for the sensor to apply the settings and an image with EV+2 is captured at image frame 309. In the example illustrated in FIG. 3, the time intervals 340 and 350 may illustrate time intervals between each captured images. As a specific example, the time interval 340 and 350 may be 33.333 ms (time interval between each consecutive frames 303, 304, 305, 306, 307, 308, and 309)*3=100 ms. The burst time 360 may be the time taken starting from when the first set of settings 310 is sent to when the last frame 309 is captured. For example, the burst time 360 may be 400 ms, starting from when the first set of settings is sent to the sensor at frame 301, till the last image EV+2 frame 309 is outputted.

Figure 4:
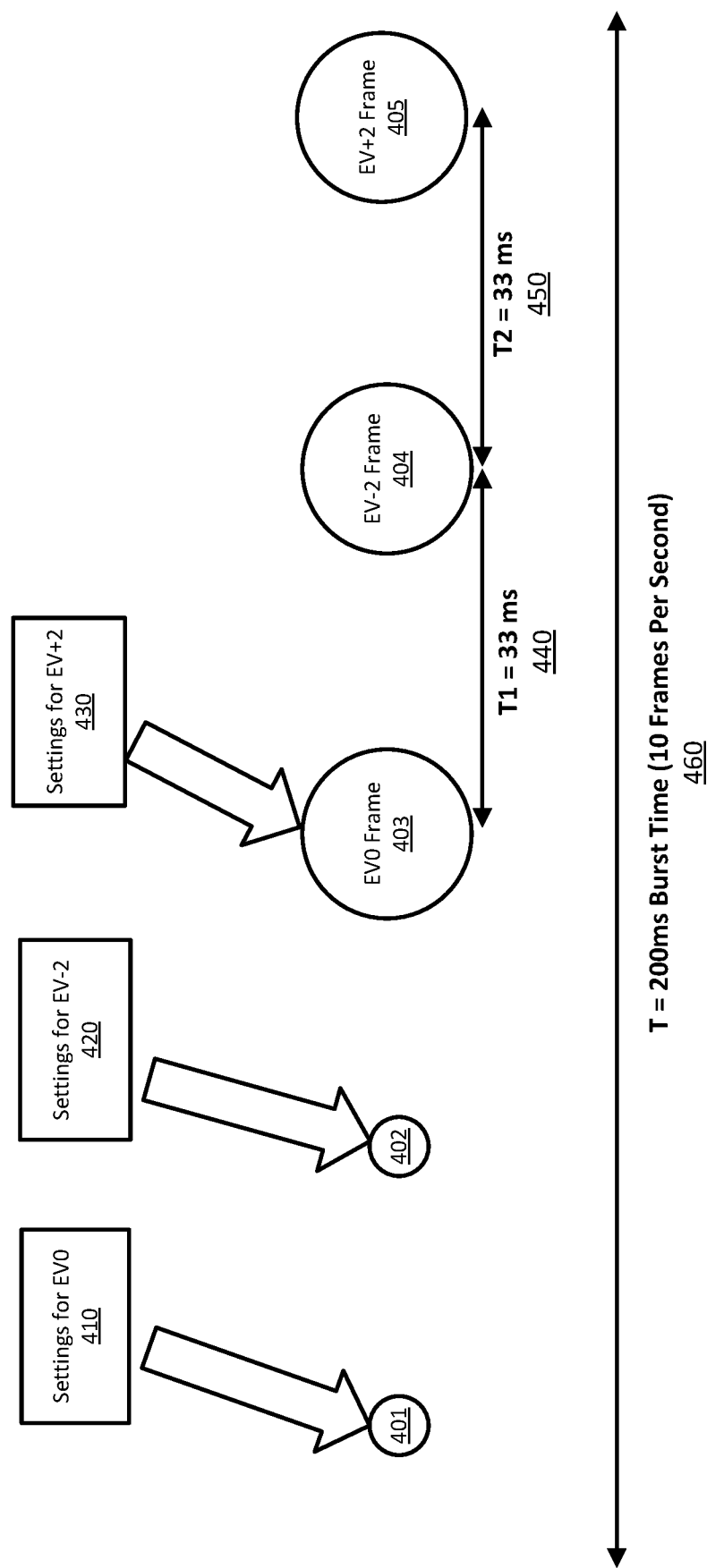
FIG. 4 is a diagram illustrating one example embodiment for taking a series of image frames using the camera system, in accordance with one or more embodiments.

FIG. 4 illustrates an exemplary embodiment for capturing a series of images for generating an HDR image, according to one or more embodiments. In the example illustrated in FIG. 4, each frame 401, 402, 403, 404, and 405 represent a frame that a sensor of a camera (e.g., the camera 210) of the camera system 200 outputs. The frames 301 and 402 represent stale frames, and the frames 403, 404, and 405 represent image frames. The exposure module 240 may first send a plurality of exposure settings 410, 420, and 430 to a sensor of a camera (e.g., the camera 210) in a series of consecutive frames. For example, the exposure module 240 may send settings 410 for EV0 at the frame 401, the settings 420 for EV−2 at the frame 402, and the settings 430 for EV+2 at the frame 403. As illustrated, sending exposure settings for EV0 410 and settings for EV−2 420 upfront result in a series of stale frames such as the frame 401 and the frame 402. The sensor takes a period of time for applying each set of settings. For example, the settings 410 for EV0 are sent during the frame 401, and the sensor may take the frame 402 to apply the configurations, such that an image can be captured at EV0 during the frame 403. Because the exposure settings are sent to the sensor over a range of consecutive frames, the captured images are outputted over a series of consecutive frames 403-405. In the example illustrated in FIG. 4, the series of captured images with different exposure settings are output over a consecutive series of frames, with EV0 captured at frame 403, EV−2 captured at frame 404, and EV+2 captured at frame 405. Note that during frame 403, the sensor receives an exposure setting in a same timing window that the sensor is capturing an image frame (the frame 403) using a previously received exposure setting (EV0). The captured images 403, 404, and 405 are separated by time intervals 440 and 450. For example, time intervals 440 and 450 may be of length 33 ms and the total burst time 460 may equal to 200 ms, starting from when the first set of settings for EV0 was sent at the frame 401, till the last image EV+2 is captured at the frame 405.

Accordingly, relative to what is shown in FIG. 4, the camera system 200 may capture the series of images with a shorter burst time (e.g., 200 ms v. 400 ms) and shorter intervals (e.g., 33 ms v. 100 ms) between each captured image. The camera system 200 takes advantage of SOF (start of frame) notifications from the stale frames to drive settings updates and to avoid a settings update penalty during the burst. Conventional camera systems taking images in burst mode for formation of a HDR image are configured to wait until the sensor has applied the exposure settings and gives a valid frame back before providing a new set of exposure values. As illustrated in FIG. 4, the camera system 200 may allow a burst to run at the sensor frame rate (15 fps) by removing the 2-frame settings update penalty between burst frames, resulting in a burst duration improvement from 400 ms to 200 ms and a frame rate increase from 10 fps to 15 fps.

FIG. 5 is a flowchart of an exemplary process 500 for capturing a sequential series of images for generating an HDR image, in accordance with one or more embodiments. The process shown in FIG. 5 may be performed by components of a camera system (e.g., the camera system 200). Other entities may perform some or all of the steps in FIG. 5 in other embodiments. Embodiments may include different and/or additional steps or perform the steps in different orders.

The camera system determines 510 a set of exposure settings for creation of an HDR image, the set of exposure settings including exposure settings corresponding to different exposure values.

The camera system 520 provides 520 the different exposure settings from the set of exposure settings in sequential timing windows to the sensor, with each set of exposure settings provided to the sensor in a different timing window.

The camera system captures 530 a sequence of images from a local area, with the sensor first outputting a plurality of stale frames in sequential timing windows, followed by a set of image frames in sequential timing windows, wherein each image frame is captured at a different exposure setting of the set of the exposure settings.

The camera system 200 generates 540 an HDR image using the captured sequence of images.

Figure 6:
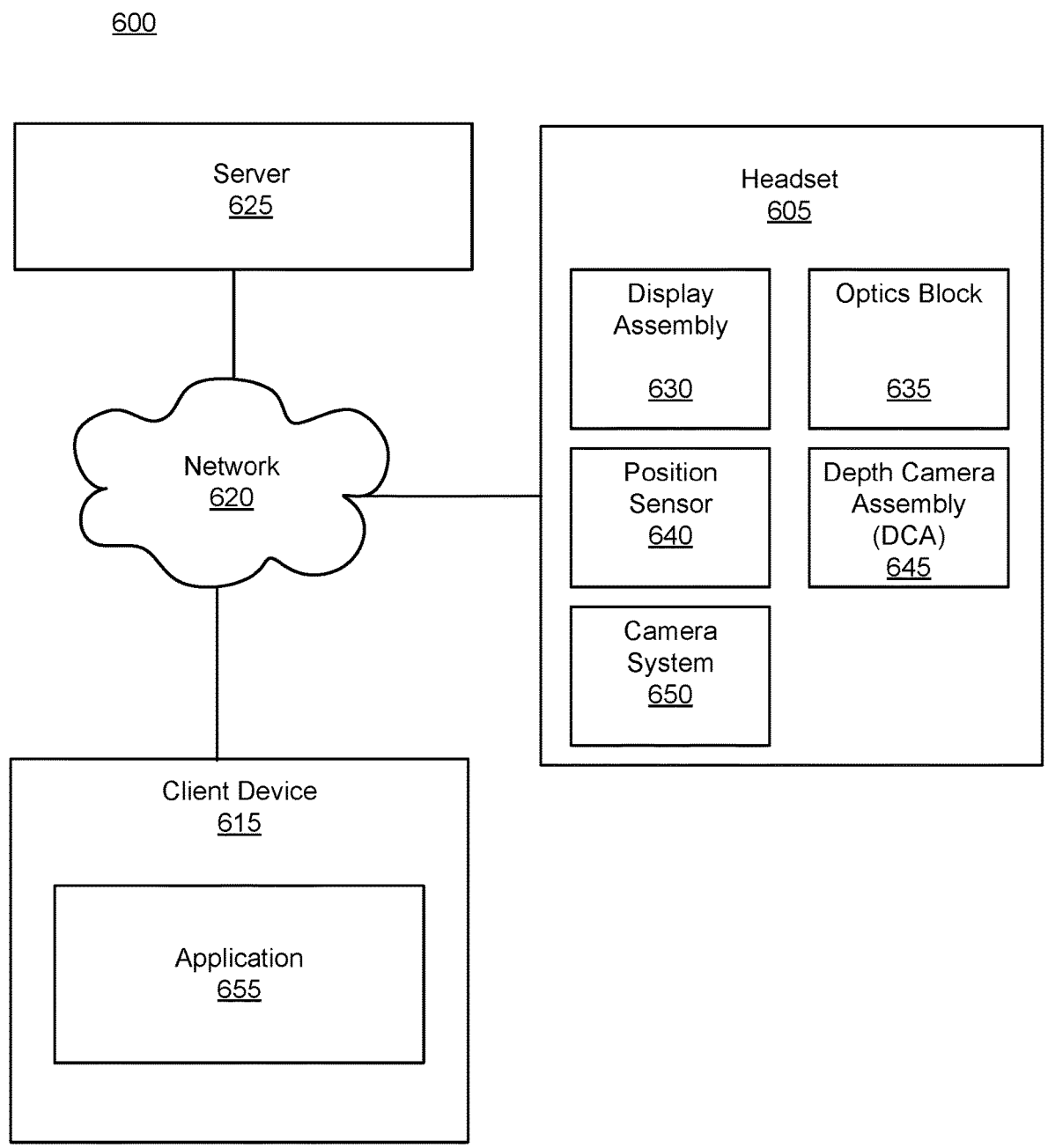
FIG. 6 is a system that includes a headset, in accordance with one or more embodiments.

FIG. 6 is a system 600 that includes a wearable device comprising a headset 605, in accordance with one or more embodiments. In the shown embodiment, the headset 605 hosts the camera system 650. In some embodiments, the headset 605 may be the headset 100 of FIG. 1A or the headset 105 of FIG. 1B. The system 600 shown by FIG. 6 includes the headset 605, the client device 615, the network 620, and the server 625. While FIG. 6 shows an example system 600 including one headset 605, in other embodiments any number of these components may be included in the system 600. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the client device 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in, conjunction with FIG. 6 may be differently distributed among the components of the headset 605 in other embodiments or be captured in separate assemblies remote from the headset 605.

The display assembly 630 displays content to the user in accordance with data received from the client device 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCS 645 is an embodiment of the DCA described in reference to FIG. 1A. The DCA includes one or more cameras and a DCA controller. In some embodiments, the one or more cameras of the camera system (e.g., camera system 200) are shared by the DCA 645. The DCA 645 may also include an illuminator. Operation and structure of the DCA 645 is described above with regard to FIG. 1A.

The camera system 650 captures images of the local area and provides image content to a user of the headset 605. The camera system 650 is substantially the same as the camera system 200 described above. The camera system 650 may comprise one or more cameras and a camera controller. The camera system 650 is configured to generate image or video content of a tracked object selected by a user of the headset 605. In one embodiment, the camera system 650 may include an exposure module 240 that reduces burst duration time between captured image frames, thereby preventing potential errors and improving image quality of the generated HDR images. The camera system 650 may use the exposure module 240 to enable the sensor to take consecutive images over consecutive frames, which decreases the chance for having an error in the HDR image and improves the image quality.

The client device 615 communicates with the headset 605 via the network 620. the client device may be a smart phone, laptop, tablet, smart watch, or other mobile device. The client device 615 hosts an application 655 associated with the headset 605. The application 655 may perform actions associated with the camera system 650. For example, the application 655 may host a profile of the user wherein the user can select privacy settings and other preferences related to the camera system 650. The application 650 may provide an interface through which captured images can be viewed. In some embodiments, the application 650 provides an interface for user input such as for the user to indicate a number of frames to take for an HDR image or which module (240 or 250) the camera system should use. The client device 615 and application 655 can further be used to indicate to the headset 605 to power on or off and capture images with the camera system 650. The application 655 may have an application store in which it can store captured images. The videos may also be uploaded to the server 625 through network 620 for cloud storage. In some embodiments location services of the client device 615 may be queried by the application 655 to indicate the location of the client device 615 relative to the headset 605. Other modules of the client device 615 such as an accelerometer may additionally be queried by the application 655. In some embodiments, the functionality discussed herein with respect to the client device 615 may be implemented in the headset 605, or a remote system. Similarly, some or all of the functionality performed by the controller of the camera system 650 of the headset 605 may be performed by the client device 615.

The network 620 couples the headset 605 and/or the client device 615 to the server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server 625 may include a database that stores a virtual model describing a plurality of spaces, wherein one location in the virtual model corresponds to a current configuration of a local area of the headset 605. The server 625 receives from the headset 605 via the network 620, information describing at least a portion of the local area and/or location information for the local area. The user may adjust privacy settings to allow or prevent the headset 605 from transmitting information to the server 625. The server 625 determines, based on the received information and/or location information, a location in the virtual model that is associated with the local area of the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the described purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining a set of exposure settings;
   providing, in first and second sequential timing windows to a sensor, respective first and second exposure settings from the set of exposure settings;
   capturing, by the sensor, a sequence of images from a local area, the capturing such that the sensor first outputs a plurality of stale frames where no images are captured in the first and second sequential timing windows followed by a set of image frames where images are captured in third and fourth sequential timing windows at the respective first and second exposure settings, wherein each image frame is captured at a different exposure setting of the set of exposure settings; and
   generating a (high-dynamic range) HDR image using the captured sequence of images.

2. The method of claim 1, wherein a stale frame, of the plurality of stale frames is outputted concurrent with a new exposure setting, of the different exposure settings, being applied to the sensor.

3. The method of claim 1, wherein after the sensor is provided with a new exposure setting, of the different exposure settings, in a first sequential timing window of the sequential timing windows, a predetermined number of sequential timing windows occur before the sensor captures images using the new exposure setting.

4. The method of claim 3, wherein the predetermined number of sequential timing windows includes at least one sequential timing window that is a stale image frame in which the sensor does not take an image.

5. The method of claim 1, wherein three sequential timing windows and two image frames were used to generate the high-dynamic range image.

6. The method of claim 1, wherein there are "N" number of sequential timing windows, "S" number of stale frames, and "I" number of images, wherein N, S, and I are integers, N=S+I, and I is greater than S.

7. The method of claim 1, wherein the sensor receives an exposure setting in a same sequential timing window that the sensor is capturing an image frame using a previously received exposure setting.

8. The method of claim 1,
   wherein the respective first exposure setting of the exposure settings is sent by an exposure module to a sensor of a camera during a first stale frame in the plurality of stale frames, and wherein a first image frame of the set of image frames is captured at the first exposure setting, the first stale frame occurring in the first sequential timing window and the first image frame captured during the third sequential timing window.

9. The method of claim 8,
   wherein the second exposure setting of the exposure settings is sent by the exposure module to the sensor of the camera during a second stale frame in the plurality of stale frames, and wherein a second image frame of the set of image frames is captured at the second exposure setting, the second stale frame occurring in the second sequential timing window and the second image frame captured during the fourth sequential timing window.

10. The method of claim 9,
wherein a third exposure setting of the exposure settings is sent by the exposure module to the sensor of the camera during the capture of the first image frame captured during the third sequential timing window, and wherein a third image frame of the set of image frames is captured at the third exposure setting, the third image frame captured during a fifth sequential timing window.

11. A system comprising:
an imaging device including an image sensor configured to capture images; and
a controller configured to:
   determine a set of exposure settings for creation of an HDR (high dynamic range) image;
   provide, in at least first and second sequential timing windows to the image sensor, different exposure settings from the set of exposure settings;
   capture, by the image sensor, images from a local area, the capturing such that the image sensor first outputs a plurality of stale frames where no images are captured in the at least first and second sequential timing windows followed by a set of image frames where images are captured in subsequent sequential timing windows, wherein each image frame is captured at a different exposure setting of the set of exposure settings; and
   generate a high-dynamic range image using the captured images.

12. The system of claim 11, wherein the controller is part of the imaging device.

13. The system of claim 11, wherein the imaging device is part of a wearable device.

14. The system of claim 13 wherein the wearable device is a headset.

15. The system of claim 11, wherein a stale frame, of the plurality of stale frames is outputted concurrent with a new exposure setting, of the different exposure settings, being applied to the image sensor.

16. A non-transitory computer-readable storage medium comprising stored instructions, the instructions when executed by a processor of a device, causing the device to:
   determine a set of exposure settings for creation of an HDR (high dynamic range) image;
   provide, in first and second sequential timing windows to a sensor, different exposure settings from the set of exposure settings;
   capture, by the sensor, images from a local area, the capturing such that the sensor first outputs a plurality of stale frames where no images are captured in the first and second sequential timing windows followed by a set of image frames where images are captured in subsequent sequential timing windows, wherein each image frame is captured at a different exposure setting of the set of exposure settings; and
   generate a high-dynamic range image using the captured images.

17. The non-transitory computer-readable storage medium of claim 16, wherein a stale frame, of the plurality of stale frames is outputted concurrent with a new exposure setting, of the different exposure settings, being applied to the sensor.

18. The non-transitory computer-readable storage medium of claim 16, wherein there are "N" number of sequential timing windows, "S" number of stale frames, and "I" number of images, wherein N, S, and I are integers, N=S+I, and I is greater than S.

19. The non-transitory computer-readable storage medium of claim 16, wherein the sensor receives an exposure setting in a same sequential timing window that the sensor is capturing an image frame using a previously received exposure setting.

* * * * *